United States Patent
Marivoet et al.

(10) Patent No.: US 12,475,083 B2
(45) Date of Patent: Nov. 18, 2025

(54) SYNCHRONIZING FILE SYSTEM ITEMS HAVING A DATA AND METADATA PORTION BETWEEN A SOURCE STORAGE SYSTEM AND A DESTINATION STORAGE SYSTEM

(71) Applicant: DATADOBI BV, Wilsele (BE)

(72) Inventors: Kim Marivoet, Lovenjoel (BE); Patrick Varilly, Wilsele (BE)

(73) Assignee: DATADOBI BV, Wilsele (BE)

( * ) Notice: Subject to any disclaimer, the term of this patent is extended or adjusted under 35 U.S.C. 154(b) by 0 days.

(21) Appl. No.: 18/290,948

(22) PCT Filed: Jul. 15, 2022

(86) PCT No.: PCT/EP2022/069923
§ 371 (c)(1),
(2) Date: Jan. 22, 2024

(87) PCT Pub. No.: WO2023/006455
PCT Pub. Date: Feb. 2, 2023

(65) Prior Publication Data
US 2025/0103558 A1    Mar. 27, 2025

(30) Foreign Application Priority Data
Jul. 27, 2021 (EP) .................................. 21187877

(51) Int. Cl.
G06F 16/00    (2019.01)
G06F 16/178   (2019.01)

(52) U.S. Cl.
CPC ................. *G06F 16/178* (2019.01)

(58) Field of Classification Search
None
See application file for complete search history.

(56) References Cited

U.S. PATENT DOCUMENTS

2015/0370827 A1* 12/2015 Parkison ............... G06F 16/178
                                                    707/610
2016/0019233 A1    1/2016 Wijayaratne et al.

FOREIGN PATENT DOCUMENTS

EP        2996025 A1    3/2016

OTHER PUBLICATIONS

Lu et al. (CN-112579550-A), "Metadata Information Synchronizing Method And System Of Distributed File System", 2021-003-30, 10 pages. (Year: 2021).*
International Search Report from corresponding PCT Application No. PCT/EP2022/069923, Oct. 31, 2022.
Extended European Search Report from corresponding EP Application No. 21187877.2, Jan. 21, 2022.

* cited by examiner

*Primary Examiner* — Bai D Vu
(74) *Attorney, Agent, or Firm* — Workman Nydegger

(57) ABSTRACT

A method for synchronizing file system items having a data and metadata portion between a source and a destination storage system; a synchronization log is maintained having synchronization log items associated with the respective file system items; a synchronization log item includes a metadata and data section comprising changetimes of the file system item on the source and destination storage system upon synchronization of the respective metadata and data portion, and includes a selected integrity level selectable from at least a data integrity level and a metadata integrity level.

13 Claims, 4 Drawing Sheets

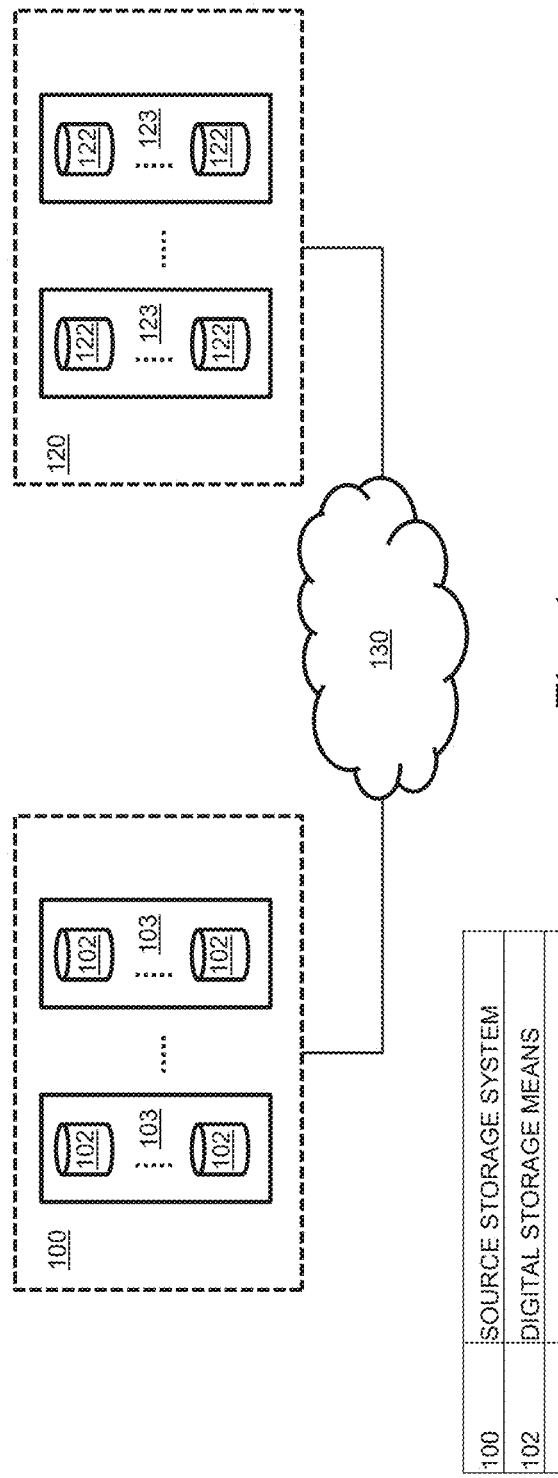

| | |
|---|---|
| 100 | SOURCE STORAGE SYSTEM |
| 120 | DESTINATION STORAGE SYSTEM |
| 500 | COMPUTING SYSTEM |
| 502 | PROCESSOR |
| 504 | LOCAL MEMORY |
| 506 | STORAGE ELEMENT INTERFACE |
| 508 | STORAGE ELEMENT |
| 510 | BUS |
| 512 | COMMUNICATION INTERFACE |
| 514 | INPUT INTERFACE |
| 516 | OUTPUT INTERFACE |
| 520 | KEYBOARD |
| 530 | MOUSE |
| 540 | DISPLAY |

SYNCHRONIZING FILE SYSTEM ITEMS HAVING A DATA AND METADATA PORTION BETWEEN A SOURCE STORAGE SYSTEM AND A DESTINATION STORAGE SYSTEM

TECHNICAL FIELD

Various example embodiments relate, amongst others, to a computer-implemented method for synchronizing file system items having a data and metadata portion between a source storage system and a destination storage system.

BACKGROUND

The need for data storage capacity is increasing rapidly every year. Today, a company's storage system may be distributed over different locations and comprise multiple server racks in one or multiple data centres where each rack houses multiple storage servers. Some companies outsource their storage needs to external storage providers offering cloud-based storage solutions. At some point in time, it may be decided to migrate data from a current storage system to a new one. This decision may be driven by several factors, but in any case, a data migration is to be performed, i.e., all file system items on the source system needs to be copied to the destination system and, at some point in time, users need to be switched to the new destination system.

For large storage systems serving tens of Terabytes up to several Petabytes of data, a single copy of all data may take in the order of days, weeks or even months. Denying user access to the storage system for such a long time is simply unacceptable and, therefore, the data migration is typically performed in different steps. First, an initial or baseline synchronization is performed between the source to the destination system. Then, one or more incremental or intermediate synchronizations are performed. An incremental synchronization only considers differences between the source and destination system. During the initial and incremental synchronizations, the users may still be allowed access to the source storage system such that there is no interruption of business. Then, at a certain planned point in time, the actual cutover or switchover is performed. During the cutover, the users are denied access from the storage systems or have read-only access and a last or cutover synchronizations is performed. When the final synchronization and all necessary checks are done, the users are switched to the new destination storage system and can again access their migrated data.

To perform a synchronization from source to destination, being initial, incremental or cutover, both source and destination are first scanned thereby obtaining a listing of data items together with some parameters such as size and timestamps. Then, the scan results are compared. From this comparison, a list of commands is generated to synchronize the destination storage system with the source storage system. Such commands may for example comprise a copy of a file system item from source to destination, a deletion of a file system item at the destination, or an update of the metadata portion of a file system item at the destination.

It is an aim to further reduce the number of generated commands, because each command takes an amount of time and, thus, increases the time of the synchronization and, hence the total time of the data migration or the time of the final cutover synchronization. Further, it is also an aim to have more precise control over the synchronization, i.e. to be able to select and determine the accuracy of a synchronization between source and destination.

SUMMARY

The scope of protection sought for various embodiments of the invention is set out by the independent claims.

The embodiments and features described in this specification that do not fall within the scope of the independent claims, if any, are to be interpreted as examples useful for understanding various embodiments of the invention.

It is an object of the present disclosure to provide a solution to the above problems.

This object is achieved, according to a first example aspect of the present disclosure, by a computer-implemented method for synchronizing file system items having a data and metadata portion between a source storage system and a destination storage system. The synchronizing comprises maintaining a synchronization log having synchronization log items associated with the respective file system items. Such a synchronization log item comprises at least a first and second section. The first section is a referred to as a metadata section and comprises changetimes of the associated file system item on the source storage system and on the destination storage system upon synchronization of the metadata portion. The second section is referred to as a data section and comprises changetimes of the respective file system item on the source storage system and on the destination storage system upon synchronization of at least both the data and metadata portion. A synchronization log item further has a selected integrity level which is selectable from at least a data integrity level and a metadata integrity level. The data integrity level guarantees the integrity of both the data and metadata portion of the file system according to the changetimes in the data section. The metadata integrity level then guarantees the metadata portion according to the changetimes in the metadata section. The synchronizing then comprises: i) scanning a type, a size, a modification timestamp, an access timestamp, and a changetime of the respective source and destination file system items; ii) determining from the scanning a synchronization status of the respective source and destination file system items; iii) generating commands for both synchronizing the respective file system items and bringing the associated synchronization logs to the respective selected integrity levels; iv) executing the commands; and v) updating, based on results of the executed commands, the synchronization log items.

In other words, the method entails a synchronization step between a source and destination storage system, for example an initial synchronization step, an intermediate synchronization step or a final cutover synchronization step. During such synchronization step, changes are performed to the destination storage systems by running the generated commands. For each file system item, e.g. a file or a directory, the command is generated based on two inputs. The first input are scanning results obtained from both the source and destination and the second input is a migration log item. While the scanning results provide information on the current status of the file system item on both source and destination, the migration log provides information on the status during preceding synchronization steps performed for the file system item. The synchronisation status is first determined by comparing attributes of the file system item on both source and destination. However, deciding whether to synchronize the file system item based on the synchronisation status still poses some possible problems. A first problem is that the type, size, the modification timestamp, and access timestamp of a file system item can be altered such that an item can appear as synchronized while being altered, both on source and destination. A second problem is that the changetime attribute is in principle unalterable during normal use, but will always be different between source and destination because of the difference in the item creation time or alteration time. A third problem is that a synchronization from source to destination for every detected update of a file system item may be too expensive in terms of time and resources. These problems are overcome by the introduction of the synchronization log item associated with each file system item. This synchronization log item is maintained over different synchronization steps, for example during a complete migration. In a synchronization log item, the changetimes of the associated file system item on both source and destination are recorded, or logged, when the item was last synchronized. These changetimes are further recorded in at least two versions or sections, i.e. the changetimes related to a synchronization of the metadata portion of the file system item and the changetimes related to the data portion of the file system item. A synchronization log item further has a selectable integrity level that can be set to at least a data integrity level and a metadata integrity level. When having the metadata integrity level, the changetimes and other information in the metadata section guarantee the integrity of the metadata portion of the associated file system item, i.e. the changetimes in the metadata section of the log item can be used to verify the integrity of the metadata of the filesystem item on the source or destination. Similarly, when having the data integrity level, the changetimes in the data section guarantees the integrity of both the metadata and data portion of the file system item. The integrity level thus provides a means for trading off the accuracy and security of the synchronization against the resource usage for the synchronization. This trade-off is apparent during the generation of the commands where the selected integrity level influences what command is generated to synchronize the file system item such that the selected integrity level is achieved. As the migration log contains the changetimes of the file system item, it is updated when executing the commands with the updated changetimes on the source and/or destination.

A generated command may correspond to a data synchronization command, i.e. a command that synchronizes both metadata and data of a respective file system item from the source storage system to the destination storage system. When executing such a data synchronization command, both the data and metadata section of the synchronization log will be updated with the new changetimes.

A generated command may also correspond to a metadata synchronization command, i.e. a command that synchronizes metadata of a respective file system item from the source storage system to the destination storage system. When executing such a metadata synchronization command, only the metadata section of the synchronization log will be updated with the new changetimes.

According to example embodiments, the generating the commands comprises generating the data synchronization command for a respective file system item associated with a respective migration log item when i) the respective migration log item has the data integrity level; ii) the respective file system item is synchronized according to the synchronization status; and iii) based on the changetimes in the data section of the respective migration log item and based on the changetime obtained from the scanning, the data integrity is not guaranteed.

The data integrity may be verified by comparing the changetime of the respective file system item on the destination storage system as obtained from the scanning with the changetime in the data section of the migration log item. When these changetimes match, data integrity can be guaranteed.

According to example embodiments, the generating the commands comprises generating the metadata synchronization command for a respective file system item associated with a respective migration log item when i) the respective migration log item has the metadata integrity level; ii) the respective file system item is synchronized according to the synchronization status; and iii) based on the changetimes in the metadata section of the respective migration log item and based on changetime obtained from the scanning, the metadata integrity is not guaranteed.

The metadata integrity may be verified by comparing the changetime of the respective file system item on the destination storage system obtained from the scanning with the changetime in the metadata section of the migration log item. When these changetimes match, metadata integrity can be guaranteed.

According to example embodiments the generating the commands further comprises generating the data synchronization command for a respective file system item associated with a respective migration log item when the respective file system item is not synchronized according to the synchronization status, and the respective file system item is not present on the destination storage system; or when the respective file system item is not synchronized according to the synchronization status, the respective file system item is present on the destination storage system, and the migration log item has the data integrity level.

According to example embodiments the generating the commands comprises generating the metadata synchronization command for a respective file system item associated with a respective migration log item when i) the migration log item has the metadata integrity level; ii) the respective file system item is not synchronized according to the synchronization status; and iii) the respective file system item is present on the destination storage system.

According to a further aspect, a computer-implemented method is disclosed for verifying a file system item synchronized according to the method according to the first aspect. The method comprising i) obtaining the migration log item associated with the file system item; ii) retrieving changetimes of the file system item on the source and/or destination storage system; iii) verifying integrity of the data and/or metadata portion of the file system item on the source and/or destination storage system by the migration log item.

According to example embodiments, the method further comprises detecting that the file system item was changed on the destination outside the synchronizing step when the changetime of the file system item on the destination is different than the changetime for the destination in the migration log item.

According to example embodiments the migration log item further comprises settings used for the synchronizing the file system item. The method then further comprises verifying whether the file system item was synchronized according to predefined target settings.

According to a third example aspect, a computer program product is disclosed comprising computer-executable instructions for causing a device to perform at least the following:

synchronizing file system items having a data and metadata portion between a source storage system and a destination storage system; and wherein the synchronizing comprises maintaining a synchronization log having synchronization log items associated with the respective file system items; and wherein a respective synchronization log item comprises:
  a metadata section comprising changetimes of the respective file system item on the source storage system and the destination storage system upon synchronization of the metadata portion, and
  a data section comprising changetimes of the respective file system item on the source storage system and the destination storage system upon synchronization of the data and metadata portion;
and wherein a respective synchronization log item has a selected integrity level selectable from at least a data integrity level and a metadata integrity level; and wherein the data integrity level guarantees integrity of the data and metadata portion for the changetimes in the data section; and wherein the metadata integrity level guarantees the metadata portion for the changetimes in the metadata section;
and wherein the synchronizing further comprises:
  scanning a type, a size, a modification timestamp, an access timestamp, and a changetime of the respective source and destination file system items;
  determining from the scanning a synchronization status of the respective source and destination file system items;
  generating commands for both synchronizing the respective file system items and bringing the associated synchronization logs to the respective selected integrity levels;
  executing the commands; and
  updating, based on results of the executed commands, the synchronization log items.

According to a fourth example aspect, a computer readable storage medium is disclosed comprising computer-executable instructions for performing the following steps when the program is run on a computer:
  synchronizing file system items having a data and metadata portion between a source storage system and a destination storage system; and wherein the synchronizing comprises maintaining a synchronization log having synchronization log items associated with the respective file system items; and wherein a respective synchronization log item comprises:
    a metadata section comprising changetimes of the respective file system item on the source storage system and the destination storage system upon synchronization of the metadata portion, and
    a data section comprising changetimes of the respective file system item on the source storage system and the destination storage system upon synchronization of the data and metadata portion;
  and wherein a respective synchronization log item has a selected integrity level selectable from at least a data integrity level and a metadata integrity level; and wherein the data integrity level guarantees integrity of the data and metadata portion for the changetimes in the data section; and wherein the metadata integrity level guarantees the metadata portion for the changetimes in the metadata section;
  and wherein the synchronizing further comprises:
    scanning a type, a size, a modification timestamp, an access timestamp, and a changetime of the respective source and destination file system items;
    determining from the scanning a synchronization status of the respective source and destination file system items;
    generating commands for both synchronizing the respective file system items and bringing the associated synchronization logs to the respective selected integrity levels;
    executing the commands; and
    updating, based on results of the executed commands, the synchronization log items.

BRIEF DESCRIPTION OF THE DRAWINGS

Some example embodiments will now be described with reference to the accompanying drawings.

FIG. 1 shows a source and destination storage system connected over a computer network according to an example embodiment;

DETAILED DESCRIPTION OF EMBODIMENT(S)

Figure 3:
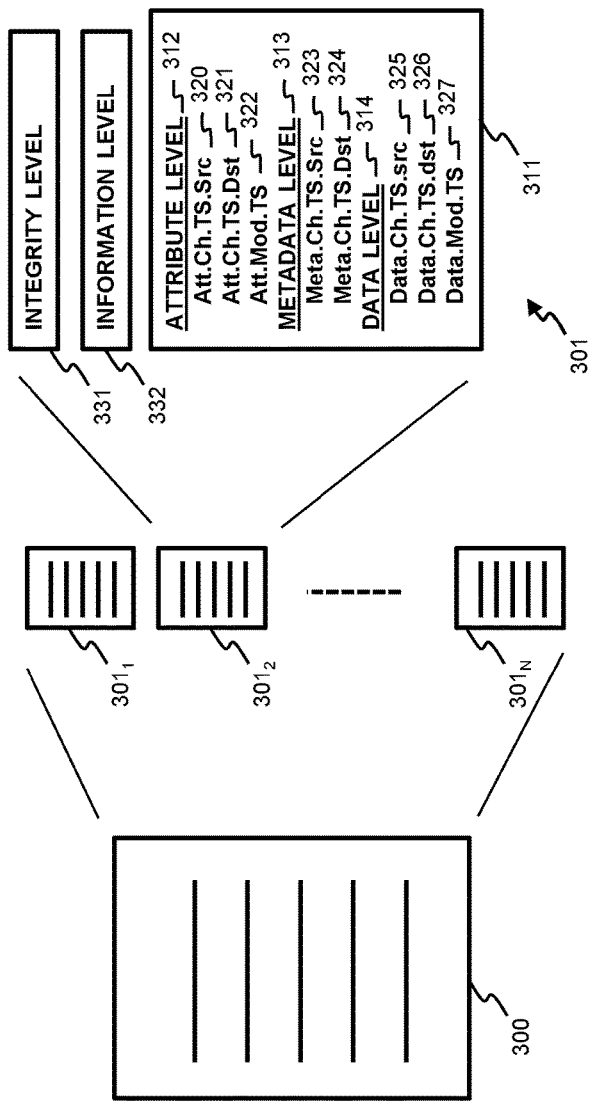
FIG. 3 shows a migration log having migration log items associated with file system items according to an example embodiment.

Example embodiments relate to the synchronization of file system items between a source storage system and a destination storage system. FIG. 1 illustrates an exemplary embodiment of such a source 100 and destination 120 storage systems. The source storage system 100 comprises a plurality of storage servers 103 each housing one or more digital storage means 102. Similarly, the destination system comprises a plurality of storage servers 123 each housing one or more digital storage means 122. The storage servers 103 and 123 may be housed in a same or different data centre inside or outside a company's data network. The storage systems 100 and 120 can offer data storage and access to users and services. Such access may be done over the network 130, e.g. the Internet or a private network. The data to be synchronized between the system 100 and the system 120 typically comprises a set of file system items that are individually accessible by a remote access protocol.

A file system item may for example correspond to a file or a directory within a hierarchical or structured file system. Various protocols may be used for accessing such file system items such as for example the Apple Filing Protocol (AFP), the Web Distributed Authoring and Versioning (WebDAV) protocol, the Server Message Block (SMB) protocol, the Common Internet File System (CIFS) protocol, the File Transfer Protocol (FTP), the Network File System (NFS) and the SSH file transfer protocol (SFTP).

For example, the Network File system may relate to any one of the following protocols: version 2 of the Network File System protocol as defined in RFC 1094; version 3 of the Network File System protocol as defined in RFC 1813; version 4 of the Network File System protocol as defined in RFC 3010, 3530, or 7530; version 4.1 of the Network File System protocol as defined in RFC 5661; and version 4.2 of the Network File System protocol as defined in RFC 7862. NFS allows handling several types of file system items such as for example a named pipe, a block device, a character device, a file, a directory and a symbolic link. NFS may also return an error if it encounters an unsupported file system item type.

Similarly, the SMB protocol may relate to version 1,2 or 3 of the Server Message Block, SMB, protocol. SMB supports different file system items such as for example a file, a directory, a mountpoint, a symbolic link and a junction point. SMB may return an error message when encountering an unsupported file system item.

A file system item contains at least a data portion and a metadata portion which needs to be synchronized between the source and destination. The data portion is the actual payload data that the file system item represents, i.e. the binary data representing the content of the item such as a document, a text file, a video file, an audio file etc. The metadata portion contains further information about the data such that it can be accessed as intended. The metadata portion may comprise access permissions associated with the file system item. Such access permissions are sometimes referred to as an access-control list or ACL. An ACL specifies which users or system processes are granted access to the file system item, as well as what operations are allowed on the file system item. The metadata portion may further contain the owner and group, alternate data streams and named attributes. Also, the metadata comprises the timestamps such as the creation time, the modification time, the access time and changetime. In other words, the metadata portion contains all information that is to be synchronized between source and destination in order to fully replicate the file system item on the destination.

Figure 2:
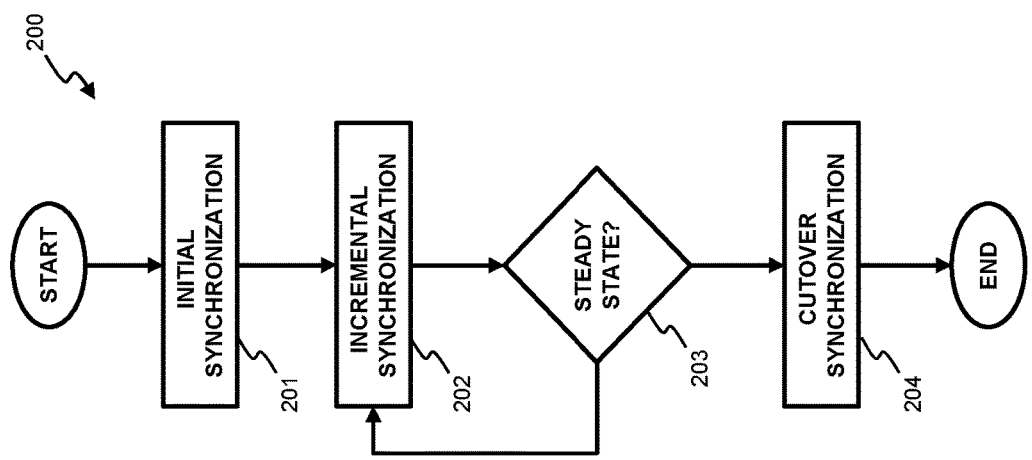
FIG. 2 shows steps for performing a synchronization from a source to a destination storage system according to an example embodiment.

FIG. 2 illustrates steps 200 for performing a data migration from a source storage system 100 to a destination storage system 120 according to an example embodiment. At some point in time, a data migration is started. Before and during the migration data, storage may still be provided from the source data storage system to users. During the migration the destination storage system is populated with copies of the file system items. At the end of the migration, during the cutover or switchover, all user access is denied to both source and destination storage systems or the users have read-only access to the source storage system and the remaining unsynchronized file system items are synchronized to the destination storage system. Then, all users are given access to the destination storage while the source storage system can be decommissioned. By the cutover during which access is denied, data integrity is guaranteed.

According to a first step 201 an initial synchronization is performed. For large data migrations, such an initial copy may take several days, weeks or even months. Apart from the size of the data, the transfer time will also be restricted by the available bandwidth for transferring the data between the source 100 and destination 120. The initial synchronization 201 may comprise a copy of all file system items on the source onto the destination. In the first step 201 all file system items are copied from the source storage system 100 to the destination storage system 120. File system items that are likely to change before the cutover may also be excluded from the initial synchronization 201. Whether or not to exclude certain file system items may defined according to migration settings or synchronization settings. As the file system items are still likely to change, a new copy will anyhow have to be made before or during the cutover. Therefore, by excluding certain file system items from the initial copy, the initial copy will take less time to perform and network bandwidth is saved. After performing the initial synchronization according to step 201, one or more incremental synchronizations 202 are made until the start of the actual cutover 204. During an incremental synchronization 202 differences between the source and destination system 100 and 120 are identified. These differences are then translated into commands such that the destination is again synchronized with the source according to the synchronization settings. If a file system item on the source has already a copy on the destination that was copied there during the initial or preceding synchronization and was further left untouched, then the file system item is not copied during the incremental synchronization 202. Therefore, the transfer size of the incremental synchronization will normally be smaller than during the initial copy 201 as it is unlikely that all file system items on the source storage system will have changed. Moreover, file system items that are likely to change before the cutover may further be excluded from the incremental synchronization 202. The step 202 of performing the incremental synchronizations may be repeated several times until the cutover 204. Step 202 may be repeated at least until the transfer size of the incremental synchronizations 402 has reached a steady state 203. Then, in step 204, the actual cutover synchronization is performed, preferably after the steady state 203 is reached. During this maintenance window, all access to the data is typically denied or only read access is granted and a final cutover synchronization 204 is performed.

FIG. 3 illustrates a migration log 300 according to an example embodiment. According to further embodiments as will be described further below, migration log 300 may be used for generating the commands executed during synchronization steps between the source storage system and destination storage system, e.g. during the initial synchronization 201, the incremental synchronization 202 and cutover synchronization 204. The synchronization log 300 contains synchronization log items 301, e.g. N items 3011 to 301x. A certain synchronization log item 301 contains structured information pertaining and thus associated with a certain file system item. These parameters and properties may be initialized or updated during synchronization steps 201, 202, and 204.

A synchronization log item has a first log section 311 which may be updated during a synchronization step. Log section 311 is divided into different levels. Log section 311 contains an attribute level 312, a metadata level 313 and a data level 314. Within each level, certain timestamps acquired during preceding synchronization steps are stored. At the attribute level 312, the following timestamps may be stored: the changetime of the associated file system item on the source storage system, denoted as Att.Ch.TS.Src 320; the changetime of the associated file system item on the destination storage system, denoted as Att.Ch.TS.Dst 321; and the modification timestamp of the associated file system item on the source, denoted as Att.Mod.TS 322. At the metadata level 313, the following timestamps may be stored: the changetime of the associated file system item on the source storage system, denoted as Meta.Ch.TS.Src 323; and the changetime of the associated file system item on the destination storage system, denoted as Meta.Ch.TS.Dst 324. At the data level 314, the following timestamps may be stored: the changetime of the associated file system item on the source storage system, denoted as Data.Ch.TS.Src 320; the changetime of the associated file system item on the destination storage system, denoted as Att.Ch.TS.Dst 321; and the modification timestamp of the associated file system item on the source, denoted as Att.Mod.TS 322. A changetime is a timestamp associated with a file system item and set by the file system to the current time every time the file system item is changed. The changetime of the file system item on the source storage system is thus set by the file system or operating system that runs on the source storage system and the changetime of the file system item on the destination storage system is set by the file system or operating system that runs on the destination storage system. A modification timestamp is set by the file system to the current time every time the data portion of the file system item is changed. Contrary to the changetime, the modification timestamp can be set by the user of the file system.

The synchronization log item 301 may further be set to a certain integrity level 331 selectable from an attribute integrity level, a metadata integrity level and a data integrity level. When the integrity level is data, the timestamps and other information under data level section 314 guarantees the integrity of the complete file system item, i.e. both the metadata and data portion. In other words, the timestamps and information under the data level section can be used to verify that the file system item on the source and destination is still synchronized. When the integrity level is metadata, the timestamps and other information listed under the meta level section 313 guarantees the integrity of the metadata portion of the file system item but not the integrity of the data portion. In other words, the timestamps and information under the metadata level section can be used to verify that the metadata portion on the file system item is still synchronized between the source and destination storage system. When the integrity level is attribute, no guarantees can be made on the integrity of the file system item, i.e. the data and metadata portion.

Likewise, the synchronization log item 301 may further be set to a certain information level 332 selectable from an attribute information level, a metadata information level and a data information level. While the integrity level 331 serves as a guarantee for the information in the synchronization log item 301 at all times, the information level 332 characterizes the section up to which the information is filled in. As such, the information level 332 should always be equal or higher than the integrity level 331 wherein the order of levels from low to high is attribute level, then metadata level, and then data level.

Figure 4:
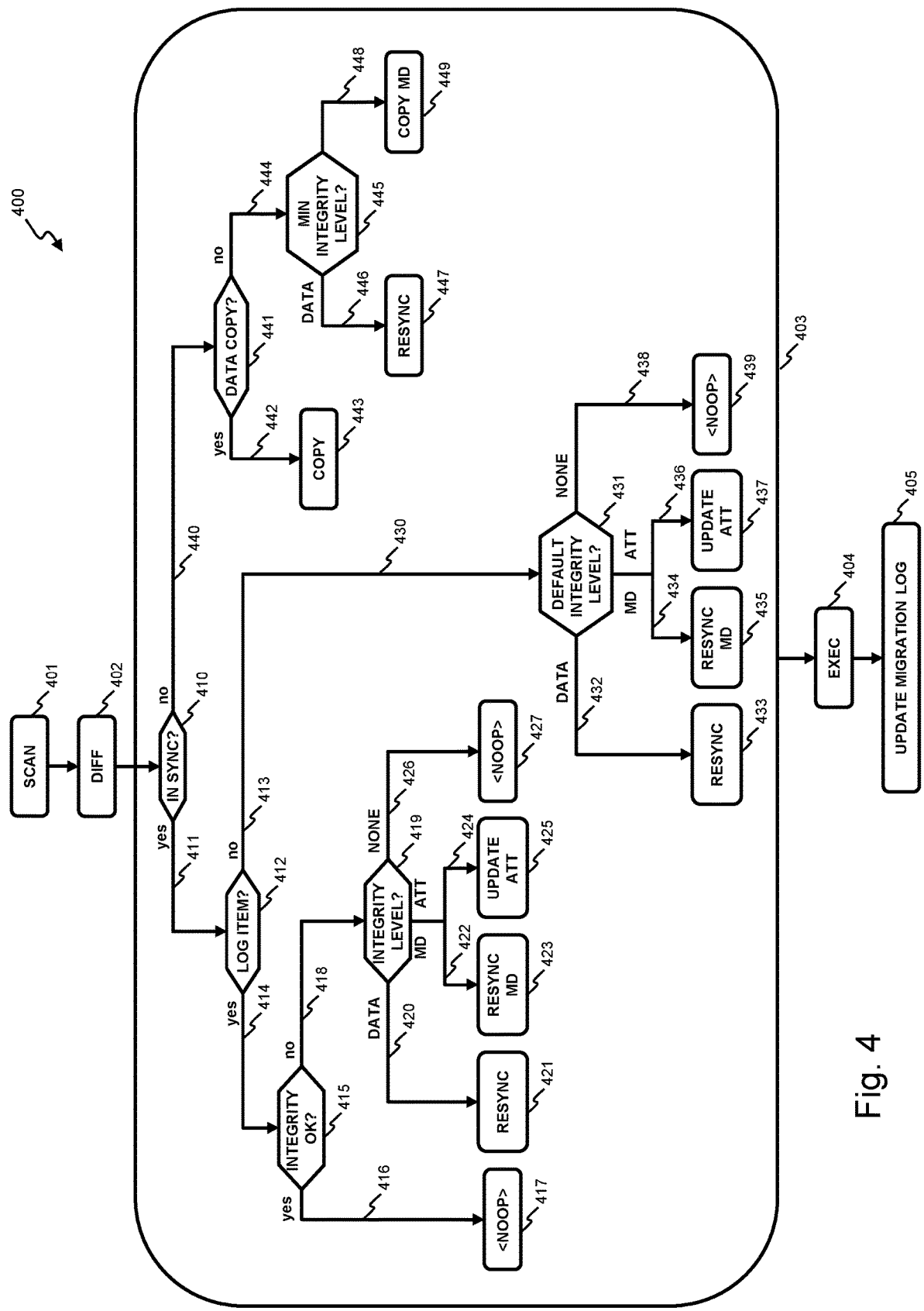
FIG. 4 shows steps for generating commands for performing a synchronization from a source to a destination storage system according to an example embodiment.
Figure 5:
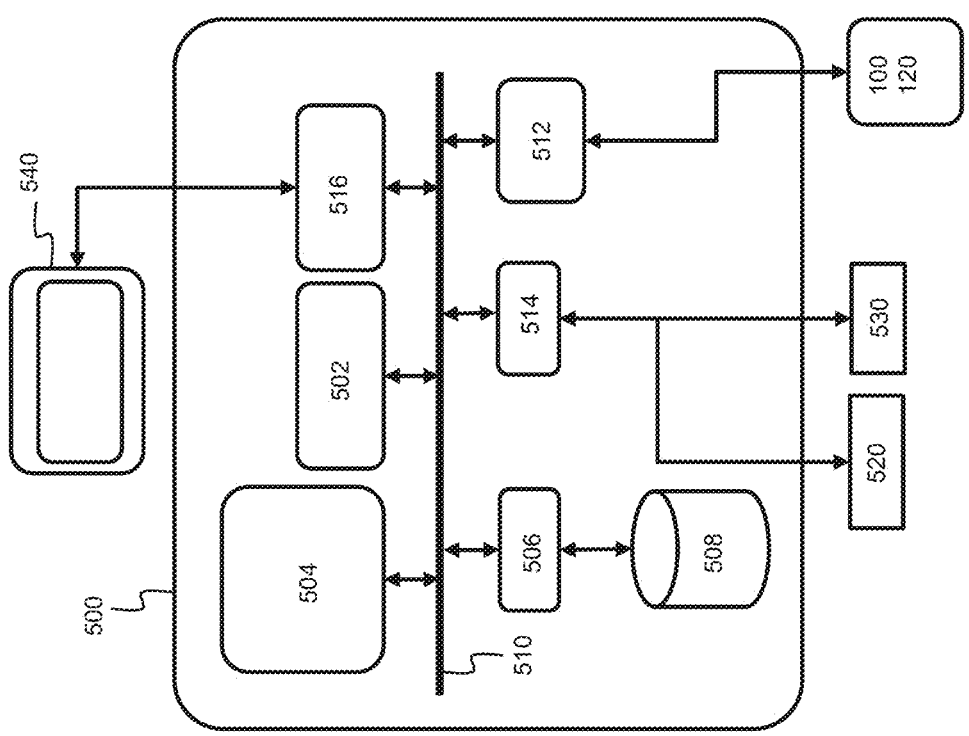
FIG. 5 shows an example embodiment of a suitable computing system for performing one or several steps according to embodiments of the invention.

FIG. 4 illustrates steps 400 for performing a synchronization of file system items from the source storage system 100 to the destination storage system 120. As such, steps 400 may be performed for the initial synchronization 201, the incremental synchronization 202, and the cutover synchronization 204. According to a first step 401 both the source and destination storage system are scanned for file system items. The scanning may be performed for the complete storage system or for a part of the storage system, e.g. for a certain directory or folder, or for a certain tier of folders or directories. By the scanning, the following attributes are returned for a detected file system item:
the type of the file system item, e.g. 'directory', 'file', 'symbolic link';
the size of the file system item, e.g. '15 KB' or '30 MB';
a modification timestamp of the file system item characterizing when the file system item was last modified;
an access timestamp of the file system item characterizing when the file system item was last accessed; and
and the changetime of the file system item characterizing when the file system item was last changed.

The modification timestamp and access timestamp is typically alterable by the user of the file system while the changetime is typically set by the file system itself and is thus not alterable by a user of the file system. After scanning step 401 two listings of these attributes is obtained for all detected file system items together with the location of the items, i.e. the full or relative path within the file system. One listing, the source listing, lists all file system items on the source storage system and another listing, the destination listing, lists all file system items on the destination storage system.

Then, according to the next step 402, differences in type, size and modification timestamps between items on the source and destination are determined. When there is no difference between a file system item on the source and destination, the items are considered synchronized, IN SYNC. File system items on source and destination are thus considered IN SYNC when:
The type of the items is the same;
The size of the items is the same; and
The modification timestamp of the items is the same
The changetime of the item on the destination is later than the changetime of the item on the source.

Then, according to a next step 403, commands are generated to synchronize the file system item between source and destination. To do this, the flow diagram illustrated in step 403 is performed for each file system item on source and/or destination. When, according to condition 410, step 402 indicates that a file system item is not synchronized, the method proceeds 440 to verification step 441. In step 441 it is verified whether the complete file system item needs to be copied from the source to the destination. This may be the case when the file system item is not yet present on the destination storage system. In that case, the method proceeds 442 to generate a COPY command 443. When executing such a COPY command the file system item on the source storage system is copied to the destination storage system and the modification timestamp on the destination is set to the one on the source. When no copy is needed 444, the method proceeds to a next verification step 445. According to step 445, the selected integrity level 331 in the associated migration log item 301 is verified. When the integrity level is DATA, the method proceeds 446 to generate a resynchronization command, RESYNC, for the file system item. When executing such a RESYNC command the complete file system item, i.e. both data and metadata portion, is synchronized from source to destination such that the size, type and modification timestamp match again. When the integrity level is not DATA, the method proceeds 448 to generate a copy metadata command, COPY MD. When executing such a COPY MD command, the metadata portion of the file system item on the source is copied onto the metadata portion in the destination such that the size, type and modification timestamp match again.

When, according to condition 410, step 402 indicates that a file system item is synchronized, IN SYNC, the method proceeds 411 to a next verification step 412. In verification step 412, it is verified whether there is a migration log item 301 present in the migration log 300 for the file system item under consideration. If so, the method proceeds 414 to a next verification step 415. In step 415 the integrity of the file system item on the destination is verified according to the selected integrity level 331 in the associated migration log item 301. To do so, the changetimes of the file system item as obtained from the scanning are compared with the changetimes of the file system item on the source and destination as specified under the level 312, 313, or 314 corresponding with the specified integrity level 331. For example, if the log item has the data integrity level, the following conditions may be checked:
1) Data.Ch.TS.src matches Ch.TS.src, and
2) Data.Ch.TS.dst matches Ch.TS.dst wherein Ch.TS.src is the changetime on the source storage system as obtained from the scanning 401 and Ch.TS.dst is the changetime on the destination storage system as obtained from the scanning 401. When condition 1) is fulfilled, then the file system item on the source is the same as the one that was previously synchronized, and when condition 2) is fulfilled, then the file system item on the destination is the same as the one that was previously synchronized. When both conditions 1) and 2) are fulfilled, then the data integrity is considered intact. Similarly, when the log item has the metadata integrity level, the following conditions may be checked:

1) Meta.Ch.TS.src matches Ch.TS.src, and
2) Meta.Ch.TS.dst matches Ch.TS.dst

When condition 1) is fulfilled, then the metadata portion of the file system item on the source is the same as the metadata portion that was previously synchronized, and when condition 2) is fulfilled, then the metadata portion of the file system item on the destination is the same as the metadata portion that was previously synchronized. When both conditions 1) and 2) are fulfilled, then the integrity of the metadata is intact.

When the integrity is still guaranteed according to step 415, then the method proceeds along path 416 and doesn't generate any command as indicated by the empty <NOOP> command 417. When one of the conditions is not fulfilled, then the method proceeds along path 418 to verification step 419. In this verification step 419 a command is generated depending on the selected integrity level 331 in the migration log item 301. When the integrity level is the data integrity level, then the method proceeds along path 420 and generates a resynchronization command, RSYNC 421. This command is the same as command 447 described above. When the integrity level is the metadata integrity level, then the method proceeds along path 422 and generates a metadata resynchronization command, RESYNC MD 423. When performing command 423, only the metadata portion of the file system item is synchronized from source to destination. When the integrity level is the attribute integrity level, then the method proceeds along path 424 and generates an update attribute command, UPDATE ATT 425. When executing command 425, the file system item is not changed at all but only the attribute level section 312 in the migration log item 301 will be updated. When there is no integrity level specified, the method proceeds along path 426 and doesn't generate any command as indicated by the empty <NOOP> command 427.

When, according to verification step 412, there is no migration log item present, then the method proceeds along path 413 to verification step 431. This situation may for example occur when performing an initial synchronization step 201 where there were already file system items present on the destination storage system. In that case it may be concluded under step 402 that the file system item is IN SYNC without having a migration log item. In this case, the steps are similar as under verification step 419, i.e. according to the outcome of the verification step 431 a command is generated depending on the default integrity level for the migration log 300. The default integrity level may be a general selectable migration or synchronization parameter that is used to initialize new migration log items 301 within the migration log 300. When the default integrity level is the data integrity level, then the method proceeds along path 432 and generates the resynchronization command, RESYNC 433. This command is the same as commands 421 and 447 described above. When the default integrity level is the metadata integrity level, then the method proceeds along path 434 and generates the metadata resynchronization command, RESYNC MD 435, as already described with reference to command 423. When the default integrity level is the attribute integrity level, then the method proceeds along path 436 and generates the update attribute command, UPDATE ATT 437, as already described with reference to command 425. When executing command 437, the file system item is not changed but only the attribute level section 312 in the migration log item 301 will be updated. When there is no integrity level specified, the method proceeds along path 438 and doesn't generate any command as indicated by the empty <NOOP> command 419.

When the commands are generated according to step 403 for all file system items under consideration by the synchronization, the method proceeds to the next execution step 404. According to this step 404 all commands generated under step 403 are executed. Execution of the commands will generate changes within the file system items. These changes are then recorded in the relevant sections of the migration log under step 405.

The RESYNC 421, 433, 447 and COPY 443 commands are commands that apply to both the data and metadata portion of a file system item. The COPY command performs an actual copy or transfer of the complete file system item from the source to the destination. The RESYNC command makes sure that the item is the same at both source and destination. The RESYNC command could be performed by the COPY command. However, in some cases it is not needed to perform a complete transfer because the RESYNC command may establish that the data and metadata portion on source and destination is the same and, hence, no actual transfer is needed. A RESYNC command may be generated when there are already file system items on both source and destination before the start of the migration, or when a migration was aborted and restarted. As such, these commands are defined as data synchronization commands that synchronize both metadata and data of a respective file system item from the source storage system to the destination storage system. When updating the migration log item under step 405 with the results of such a data synchronization command the timestamps and other information in the migration log item 301 are updated at all levels, i.e attribute level 312, metadata level 313, and data level 314 irrespective of their selected integrity level 331. Further, as the integrity is now guaranteed at all the levels, the information level 332 is set to the data level integrity because the information available under the data level 314 can be used to verify the integrity of both the data and metadata portion of the associated file system item.

The RESYNC MD 423, 435 and COPY MD 449 commands are commands that apply to only the metadata portion of the file system item. As such, these commands are defined as metadata synchronization commands that synchronize only the metadata portion of a respective file system item from the source storage system to the destination storage system. When updating the migration log item under step 405 with the results of such a metadata synchronization command the timestamps and other information in the migration log item 301 are updated up to the metadata level 313, i.e. at the attribute level 312 and the metadata level 313 irrespective of their selected integrity level 331. Further, as the integrity is now guaranteed up to the metadata level, the information level 332 is set to the metadata integrity level because the information available under the metadata level 313 can be used to verify the integrity of metadata portion of the associated file system item.

The UPDATE ATT command 425, 437 does not synchronize the file system item and does not change the file system item on either the source of destination. The UPDATE ATT 425, 437 command only triggers an update at the attribute level 312 of the migration log item 301 with the timestamps and information that was received from the initial scanning operation 401. The UPDATE ATT 425, 437 command will therefore only be applied for the attribute integrity level 331 and will set the information level 332 also to the attribute level.

According to example embodiments, the migration log 300 and synchronization method 400 provides a means to consider the last known state of the file system items when performing a new synchronization step. This allows detecting changes to file system items that cannot be detected under step 402 as described under branch 411 of step 403. This further allows limiting the amount of data that is copied during the execution 404 of the commands. For example, when a file system item is not in sync, it is still possible that only the metadata portion needs to be updated as shown under step 449. This further allows tuning the accuracy of what a synchronization actually does by setting the integrity level.

According to example embodiments, the migration log 300 and synchronization method 400 may be limited to only the metadata and data level integrity level 331 thereby omitting the attribute level section 312 from the migration log item. According to example embodiments, the migration log 300 and synchronization method 400 may be further extended with more integrity levels for when synchronizing file systems data have more distinct portions of data within a file system item.

According to example embodiments, other information may be incorporated under the different levels 312, 313 and 314 of the migration log 300. For example, a 'synchronization setting' entry may be added under the metadata level section 313. This 'setting' entry then contains certain rules or conditions that were applied upon synchronization of the metadata portion of the file system item. An example of such a setting is a rule that the owner of the file system item is changed during the synchronization. By specifying the rule in the metadata level section, this rule can be considered when verifying the integrity of the metadata portion of the file system item on the destination storage system. Another example is an entry with a digest in the metadata or data level section, i.e. by adding a digest or hash of the metadata portion under the metadata section 313, or by adding a digest or hash of the data portion under the data section 314. These digests can then be used for verifying the integrity of the file system item on either the source or destination without the need for a bitwise comparison.

The above example embodiments according to FIG. 3 and FIG. 4 are illustrated for a one-way synchronization from a source storage system to a destination storage system. Such a one-way synchronization may be used for performing a migration as illustrated with reference to FIG. 2 or for performing a backup of the source storage system onto the destination storage system. According to other example embodiments, the example embodiments according to FIG. 3 and FIG. 4 may be adapted for other synchronizations scenarios, e.g. for a two-way synchronization between two storage systems where both are considered source as well as destination. Such scenarios may be implemented by changing the applied conditions and commands.

According to example embodiments, the migration log 300 may also be used outside a synchronization step, for example to verify the status of file system items on the source and destination and to guarantee the integrity of the file system item. Some examples of such verifications are listed below:

1) When adding the attributes resulting from the scanning step 401 in the attribute section according to the UPDATE ATT command, and when the changetime of a file system item on the destination matches the Att.Ch.TS.Dst timestamp 321, then attribute section guarantees that 'given these attribute values the DIFF step 402 assumed source and destination were in sync and decided to do no synchronization'.
2) When adding the settings used for the synchronization in the metadata section 313, and when the changetime of a file system item on the destination matches the Meta.Ch.TS.Dst timestamp 324, then it is guaranteed that the metadata on the destination is the result of applying the specified settings to the metadata associated with the Meta.Ch.TS.Src 323 from the source and writing this metadata on the destination.
3) When adding the digest or other information of the data portion data section 314, and when the changetime of a file system item on the destination matches the Data.Ch.TS.Dst timestamp 326, then it is guaranteed that the digest and other information will match with the digest and other information on the destination.
4) When the Att.Ch.TS.Src 320 matches with the changetime of the file system item on the source it is guaranteed that the attributes on the source are still the same as the ones under the attribute section 312.
5) When the Meta.Ch.TS.Src 321 matches with the changetime of the file system item on the source it is guaranteed that the metadata portion as currently on the source is the one that was synchronized to the destination, and all further information under the metadata section 313 should match on the source.
6) When the Data.Ch.TS.Src 325 matches with the changetime of the file system item on the source it is guarantees that the data portion of the file system item on the source is the one was synchronized to the destination, and that all further information specified under the data section 314 matches with the file system item on the source.
7) When the type of the file system item, the modification timestamp of the file system item and the size of the file system item is included in the data level section 314 and these match with the information obtained during the scanning step 401, and when the integrity level 331 is the metadata integrity level, and when there is no 'stealth' modification, then the information in the data section 314 can also be guaranteed. A 'stealth' modification is a modification of a file system item on the source that cannot be detected based on the scanning results during step 402, e.g. when metadata on the source has been changed but with equal size and when the modification timestamp has been kept.

The steps as described above may be performed a suitable computing system or controller that has access to the source and destination storage system. To this end, the steps may be performed from within storage system 100 or 120. The execution of the commands according to step 404 may further be performed in parallel by different computing systems to speed up the execution of the commands. Computing system 500 may in general be formed as a suitable general-purpose computer and comprise a bus 510, a processor 502, a local memory 504, one or more optional input interfaces 514, one or more optional output interfaces 516, a communication interface 512, a storage element interface 506, and one or more storage elements 508. Bus 510 may comprise one or more conductors that permit communication among the components of the computing system 500. Processor 502 may include any type of conventional processor or microprocessor that interprets and executes programming instructions. Local memory 504 may include a random-access memory (RAM) or another type of dynamic storage device that stores information and instructions for execution by processor 502 and/or a read only memory (ROM) or another type of static storage device that stores static information and instructions for use by processor 502. Input interface 514 may comprise one or more conventional mechanisms that permit an operator or user to input information to the computing device 500, such as a keyboard 520, a mouse 530, a pen, voice recognition and/or biometric mechanisms, a camera, etc. Output interface 516 may comprise one or more conventional mechanisms that output information to the operator or user, such as a display 540, etc. Communication interface 512 may comprise any transceiver-like mechanism such as for example one or more Ethernet interfaces that enables computing system 500 to communicate with other devices and/or systems, for example with other computing devices 581, 582, 583. The communication interface 512 of computing system 500 may be connected to such another computing system, e.g. the source or destination storage systems 100, 120, by means of a local area network (LAN) or a wide area network (WAN) such as for example the internet. Storage element interface 506 may comprise a storage interface such as for example a Serial Advanced Technology Attachment (SATA) interface or a Small Computer System Interface (SCSI) for connecting bus 510 to one or more storage elements 508, such as one or more local disks, for example SATA disk drives, and control the reading and writing of data to and/or from these storage elements 508. Although the storage element(s) 508 above is/are described as a local disk, in general any other suitable computer-readable media such as a removable magnetic disk, optical storage media such as a CD or DVD, -ROM disk, solid state drives, flash memory cards, . . . could be used.

As used in this application, the term "circuitry" may refer to one or more or all of the following:
(a) hardware-only circuit implementations such as implementations in only analog and/or digital circuitry and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and/or processor(s), such as microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:
1. A computer-implemented method for synchronizing file system items having a data and metadata portion between a source storage system and a destination storage system;
  wherein the synchronizing comprises maintaining a synchronization log having synchronization log items associated with file system items; and
  wherein a respective synchronization log item comprises:
  a metadata section comprising changetimes of a respective file system item on the source storage system and the destination storage system upon synchronization of the metadata portion, and
  a data section comprising changetimes of the respective file system item on the source storage system and the destination storage system upon synchronization of the data and metadata portion; and
  wherein the respective synchronization log item has a selected integrity level selectable from at least a data integrity level and a metadata integrity level; and
  wherein the data integrity level guarantees integrity of the data and metadata portion for the changetimes in the data section; and wherein the metadata integrity level guarantees the metadata portion for the changetimes in the metadata section; and
  wherein the synchronizing further comprises:
  scanning a type, a size, a modification timestamp, an access timestamp, and a changetime of the respective file system item on the source storage system and the destination storage system;
  determining from the scanning a synchronization status of the respective file system item on the source storage system and the destination storage system;

generating commands based on the synchronization status for both synchronizing the respective file system item on the source storage system and the destination storage system and bringing the synchronization log to the selected integrity level;

executing the commands; and updating, based on results of the executed commands, the synchronization log items.

2. The method according to claim 1, wherein the commands are selected from the group comprising at least:

a data synchronization command that synchronizes both metadata and data of a respective file system item from the source storage system to the destination storage system; and a metadata synchronization command that synchronizes metadata of the respective file system item from the source storage system to the destination storage system.

3. The method according to claim 2, wherein, when executing a data synchronization command on a respective file system item, the updating comprises updating the data and metadata section; and wherein, when executing a metadata synchronization command on the respective file system item, the updating comprises updating the metadata section.

4. The method according to claim 2, wherein the generating the commands comprises generating the data synchronization command for a respective file system item associated with a respective migration log item when:

the respective migration log item has the data integrity level;

the respective file system item is synchronized according to the synchronization status; and based on the changetimes in the data section of the respective migration log item and based on changetime obtained from the scanning, the data integrity is not guaranteed.

5. The method according to claim 4, wherein the data integrity is guaranteed when the changetime of the respective file system item on the destination storage system obtained from the scanning matches with the changetime in the data section of the respective migration log item.

6. The method according to claim 2, wherein the generating the commands comprises generating the metadata synchronization command for a respective file system item associated with a respective migration log item when:

the respective migration log item has the metadata integrity level;

the respective file system item is synchronized according to the synchronization status;

based on the changetimes in the metadata section of the respective migration log item and based on changetime obtained from the scanning, the metadata integrity is not guaranteed.

7. The method according to claim 6, wherein the metadata integrity is guaranteed when the changetime of the respective file system item on the destination storage system obtained from the scanning matches with the changetime in the metadata section of the respective migration log item.

8. The method according to claim 2, wherein the generating the commands further comprises generating the data synchronization command for a respective file system item associated with a respective migration log item when:

the respective file system item is not synchronized according to the synchronization status, and the respective file system item is not present on the destination storage system; or the respective file system item is not synchronized according to the synchronization status, the respective file system item is present on the destination storage system, and the respective migration log item has the data integrity level.

9. The method according to claim 2, wherein the generating the commands comprises generating the metadata synchronization command for a respective file system item associated with a respective migration log item when:

the respective migration log item has the metadata integrity level;

the respective file system item is not synchronized according to the synchronization status; and the respective file system item is present on the destination storage system.

10. A computer-implemented method for verifying a file system item synchronized according to the method according to claim 1; the method comprising:

obtaining the respective migration log item associated with the file system item;

retrieving changetimes of the file system item on the source and/or destination storage system;

verifying integrity of at least one of the data and metadata portion of the file system item on at least one of the source and destination storage system by the respective migration log item.

11. The method according to claim 10, wherein the method further comprises:

detecting that the file system item was changed on the destination outside the synchronizing step when the changetime of the file system item on the destination is different than the changetimes for the destination in the respective migration log item.

12. The method according to claim 10, wherein the respective migration log item further comprises settings used for the synchronizing the file system item; and wherein the method further comprises verifying whether the file system item was synchronized according to predefined target settings.

13. A non-transitory computer readable storage medium comprising computer-executable instructions for performing the following steps when run on a computer:

synchronizing file system items having a data and metadata portion between a source storage system and a destination storage system; and wherein the synchronizing comprises maintaining a synchronization log having synchronization log items associated with file system items; and wherein a respective synchronization log item comprises:

a metadata section comprising changetimes of a respective file system item on the source storage system and the destination storage system upon synchronization of the metadata portion, and a data section comprising changetimes of the respective file system item on the source storage system and the destination storage system upon synchronization of the data and metadata portion; and wherein the respective synchronization log item has a selected integrity level selectable from at least a data integrity level and a metadata integrity level; and wherein the data integrity level guarantees integrity of the data and metadata portion for the changetimes in the data section; and wherein the metadata integrity level guarantees the metadata portion for the changetimes in the metadata section; and wherein the synchronizing further comprises:
scanning a type, a size, a modification timestamp, an access timestamp, and a changetime of the respective file system item on the source storage system and the destination storage system;
determining from the scanning a synchronization status of the respective file system item on the source storage system and the destination storage system;
generating commands based on the synchronization status for both synchronizing the respective file system item on the source storage system and the destination storage system and bringing the synchronization log to the selected integrity level;
executing the commands; and
updating, based on results of the executed commands, the synchronization log items.

\* \* \* \* \*